US012017902B2

(12) United States Patent
Van Vliet et al.

(10) Patent No.: US 12,017,902 B2
(45) Date of Patent: Jun. 25, 2024

(54) FUEL DELIVERY SYSTEM AND METHOD

(71) Applicant: Energera Inc., Acheson (CA)

(72) Inventors: J. Todd Van Vliet, Edmonton (CA); Scott M. Van Vliet, Okotoks (CA); Glen M. Brotzel, Sherwood Park (CA)

(73) Assignee: Energera Inc., Acheson (CA)

( * ) Notice: Subject to any disclaimer, the term of this patent is extended or adjusted under 35 U.S.C. 154(b) by 293 days.

(21) Appl. No.: 17/687,386

(22) Filed: Mar. 4, 2022

(65) Prior Publication Data

US 2022/0234881 A1 Jul. 28, 2022

Related U.S. Application Data

(63) Continuation of application No. 15/997,340, filed on Jun. 4, 2018, now Pat. No. 11,286,154, which is a continuation of application No. 15/144,547, filed on May 2, 2016, now Pat. No. 10,029,906, which is a continuation of application No. 13/028,991, filed on Feb. 16, 2011, now Pat. No. 9,346,662.

(60) Provisional application No. 61/305,320, filed on Feb. 17, 2010.

(30) Foreign Application Priority Data

Feb. 16, 2010 (CA) ................................ CA 2693567

(51) Int. Cl.

| | |
|---|---|
| ***B67D 7/36*** | (2010.01) |
| ***B67D 7/04*** | (2010.01) |
| ***B67D 7/70*** | (2010.01) |

(52) U.S. Cl.

CPC ............. *B67D 7/0401* (2013.01); *B67D 7/04* (2013.01); *B67D 7/362* (2013.01); *B67D 7/70* (2013.01); *B67D 2007/0444* (2013.01)

(58) Field of Classification Search

CPC .......... B67D 7/401; B67D 7/04; B67D 7/362; B67D 7/70; B67D 7/0444

See application file for complete search history.

(56) References Cited

U.S. PATENT DOCUMENTS

| | | | |
|---|---|---|---|
| 489,107 | A | 1/1893 | Storz |
| 599,702 | A | 3/1898 | Griswold |
| 2,340,070 | A | 1/1944 | McCauley et al. |

(Continued)

FOREIGN PATENT DOCUMENTS

| | | | |
|---|---|---|---|
| AU | 2003248297 | A1 | 4/2005 |
| CA | 86793 | | 5/1999 |

(Continued)

OTHER PUBLICATIONS

"FloMax High Flow Series Connectors Helping Prevent Cross Contamination," Flomax International Inc., 1 page.

(Continued)

*Primary Examiner* — Jason K Niesz

(74) *Attorney, Agent, or Firm* — Seed IP Law Group LLP

(57) ABSTRACT

A fuel delivery system and method for reducing the likelihood that a fuel tank of equipment at a well site during fracturing of a well will run out of fuel. A fuel source has plural fuel outlets, a hose on each fuel outlet of the plural fuel outlets, each hose being connected to a fuel cap on a respective one of the fuel tanks for delivery of fuel to the fuel tank. At least a manually controlled valve at each fuel outlet controls fluid flow through the hose at the respective fuel outlet.

28 Claims, 4 Drawing Sheets

(56) References Cited

U.S. PATENT DOCUMENTS

| | | | |
|---|---|---|---|
| 2,498,229 A | 2/1950 | Adler | |
| 2,516,150 A | 7/1950 | Samiran | |
| 2,730,126 A | 1/1956 | Jensen | |
| 2,749,062 A | 6/1956 | MacIntyre | |
| 2,769,572 A | 11/1956 | Harman et al. | |
| 2,833,567 A | 5/1958 | Bacher et al. | |
| 2,992,560 A | 7/1961 | Morgan et al. | |
| 3,028,101 A | 4/1962 | Headrick | |
| 3,066,890 A | 12/1962 | Price | |
| 3,136,295 A | 6/1964 | Gramo | |
| 3,331,392 A | 7/1967 | Davidson et al. | |
| 3,547,141 A | 12/1970 | Claude et al. | |
| 3,618,643 A | 11/1971 | Thomson et al. | |
| 3,677,284 A | 7/1972 | Mendez | |
| 3,688,795 A | 9/1972 | Taylor | |
| 4,059,134 A | 11/1977 | Violette | |
| 4,139,019 A | 2/1979 | Bresie et al. | |
| 4,397,405 A | 8/1983 | Batson | |
| 4,522,237 A | 6/1985 | Endo et al. | |
| 4,591,115 A | 5/1986 | DeCarlo | |
| 4,638,842 A | 1/1987 | Hawley et al. | |
| 4,671,329 A | 6/1987 | Kovacevich, Jr. | |
| 4,770,317 A | 9/1988 | Podgers | |
| 4,907,630 A | 3/1990 | Kulikowski et al. | |
| 5,295,521 A | 3/1994 | Bedi | |
| 5,351,754 A | 10/1994 | Hardin et al. | |
| 5,388,622 A | 2/1995 | Philips | |
| 5,406,988 A | 4/1995 | Hopkins | |
| 5,454,408 A | 10/1995 | DiBella et al. | |
| 5,503,199 A | 4/1996 | Whitley, II et al. | |
| 5,531,247 A | 7/1996 | Borst et al. | |
| 5,538,051 A | 7/1996 | Brown et al. | |
| 5,651,400 A * | 7/1997 | Corts | B67D 7/54 141/DIG. 1 |
| 5,708,424 A | 1/1998 | Orlando et al. | |
| 5,769,109 A | 6/1998 | Stanton et al. | |
| 5,884,675 A | 3/1999 | Krasnov | |
| 5,918,256 A | 6/1999 | Delaney | |
| 5,927,603 A | 7/1999 | McNabb | |
| 5,944,074 A | 8/1999 | Leahy et al. | |
| 5,983,962 A | 11/1999 | Gerardot | |
| 6,032,699 A | 3/2000 | Cochran et al. | |
| 6,102,086 A | 8/2000 | Holtby | |
| 6,178,990 B1 | 1/2001 | Bellenger et al. | |
| 6,206,056 B1 | 3/2001 | Lagache | |
| 6,478,576 B1 | 11/2002 | Bradt et al. | |
| 6,564,615 B1 | 5/2003 | Carter | |
| 6,637,466 B2 | 10/2003 | Mills, Jr. | |
| 6,651,706 B2 | 11/2003 | Litt | |
| 6,697,705 B2 | 2/2004 | Johnson et al. | |
| 6,755,225 B1 | 6/2004 | Niedwiecki et al. | |
| 6,761,194 B1 | 7/2004 | Blong | |
| 6,779,569 B1 | 8/2004 | Teer, Jr. et al. | |
| 6,786,245 B1 | 9/2004 | Eichelberger et al. | |
| 6,799,528 B1 | 10/2004 | Bekker | |
| 6,960,377 B2 | 11/2005 | Shifman | |
| 7,020,906 B2 | 4/2006 | Cuffari, Jr. et al. | |
| 7,063,276 B2 | 6/2006 | Newton | |
| 7,106,026 B2 | 9/2006 | Moore | |
| 7,353,808 B2 | 4/2008 | Kakoo | |
| 7,415,995 B2 | 8/2008 | Plummer et al. | |
| 7,441,569 B2 | 10/2008 | Lease | |
| 7,458,543 B2 | 12/2008 | Cutler et al. | |
| 7,568,507 B2 | 8/2009 | Farese et al. | |
| 7,602,143 B2 | 10/2009 | Capizzo | |
| 7,628,182 B2 | 12/2009 | Poulter et al. | |
| 7,735,672 B2 * | 6/2010 | Voss, III | B60K 15/0406 220/202 |
| 7,928,151 B2 | 5/2011 | Höckner | |
| 7,938,151 B2 * | 5/2011 | Hockner | B60P 3/228 141/237 |
| 8,042,376 B2 | 10/2011 | Yang et al. | |
| 8,671,998 B2 | 3/2014 | Lohmann | |
| 2003/0098017 A1 | 5/2003 | Williams, Sr. | |
| 2003/0111129 A1 | 6/2003 | Mills, Jr. | |
| 2003/0234254 A1 | 12/2003 | Grybush et al. | |
| 2004/0187950 A1 | 9/2004 | Cohen et al. | |
| 2006/0086411 A1 | 4/2006 | Luca | |
| 2006/0266430 A1 | 11/2006 | Luca | |
| 2007/0079891 A1 | 4/2007 | Farese et al. | |
| 2007/0164031 A1 | 7/2007 | Holz | |
| 2007/0181212 A1 * | 8/2007 | Fell | B60P 3/14 141/231 |
| 2008/0223482 A1 | 9/2008 | Hockner | |
| 2008/0313006 A1 | 12/2008 | Witter et al. | |
| 2009/0078507 A1 | 3/2009 | Gaugush et al. | |
| 2009/0159134 A1 | 6/2009 | Boyher et al. | |
| 2009/0187416 A1 | 7/2009 | Baer et al. | |
| 2010/0000508 A1 | 1/2010 | Chandler | |
| 2011/0297271 A1 | 12/2011 | Haak | |

FOREIGN PATENT DOCUMENTS

| | | |
|---|---|---|
| CA | 2 447 218 | 5/2005 |
| DE | 103 36 792 A1 | 3/2005 |
| EP | 0 418 744 A2 | 3/1991 |
| EP | 2003-341797 A | 12/2003 |
| EP | 1 890 028 A2 | 2/2008 |
| GB | 2 049 570 A | 12/1980 |
| JP | 2003-2400 A | 1/2003 |
| OA | 09603 | 4/1993 |
| WO | 95/12545 A1 | 5/1995 |
| WO | 01/77006 A1 | 10/2001 |
| WO | 03/059802 A1 | 7/2003 |
| WO | 2006/005686 A1 | 1/2006 |
| WO | 2008/083830 A2 | 7/2008 |
| WO | 2009/026607 A1 | 5/2009 |
| WO | 2009/068065 A1 | 6/2009 |
| WO | 2009/132347 A1 | 10/2009 |
| WO | 2012/177451 A1 | 12/2012 |

OTHER PUBLICATIONS

*2008 New York City Mechanical Code*, International Code Council, Club Hills, IL, 2008, 242 pages.

Adler (Ed.) et al., *Internal-combustion engines*, Third edition, Robert Bosch GmbH, Stuttgart, Germany, 1993, pp. 352-353, 362-367, 5 pages.

*Cambridge Advanced Learner's Dictionary*, Third Edition, Cambridge University Press, Cambridge, UK, 2008, p. 200, 3 pages.

Canada Federal Court, 2017 FC 104, T-2149-14, Judgment and Reasons, dated Jan. 26, 2017.

Canada Federal Court, T-1580-16, Statement of Claim, dated Sep. 21, 2016.

Carmichael (Ed.), *Kent's Mechanical Engineers' Handbook*, Twelfth Edition, John Wiley and Sons, New York, N.Y., 1950, pp. 13-06-13-19, 9 pages.

Chemical Equipment, "Product Spotlight, Control Valves and Actuators," product data sheet, www.chemicalequipment.com, Sep. 2002, 1 page.

Claim Construction Order, *Frac Shack* v. *Atlas*, No. 16-cv-02275 (D. Col. issued Mar. 9, 2018) (Dkt. 92), 39 pages.

Claim Construction Order construing "Secured," *Eazypower* vs. *Vermont Am. Grp.*, No. 01-C-3253 (N.D. Ill. Mar. 26, 2003), 21 pages.

Declaration of Petitioner's expert Mr. Richard N. Berry, Exhibit 1003 to Petition for Inter Partes Review of U.S. Pat. No. 10,029,906, dated Apr. 18, 2019, 93 pages.

Defendant Atlas Oil Company's Invalidity Contentions, U.S. Dist. Ct. Colorado, C.A. No. 1:16-cv-02275-STV, dated Dec. 29, 2016.

Defendant Atlas Oil Company's Response to Infringement Contentions, U.S. Dist. Ct. Colorado, C.A. No. 1:16-cv-02275-STV, dated Dec. 29, 2016.

Del Veccio, *Dictionary of Mechanical Engineering*, Philosophical Library, Inc., New York, N.Y., 1961, p. 184, 3 pages.

Emco Wheaton, "Surelok Fast Coupler Product Data Sheet," Dec. 2009, 2 pages.

Encyclopedia.com, "Ctesibius (Ktesibios)," Scientific Biography, downloaded from http://www.encyclopedia.com/people/science-and-technology/technology-biographies/ctes . . . on Apr. 28, 2017, 3 pages.

(56) References Cited

OTHER PUBLICATIONS

EPW Inc., "Auto Limiter II Automatic Shut-Off Valve for UST's" Pamphlet on auto Limited II overfill Protection, 1 page.
Examination Report No. 2 for Australian Application No. 2017254826 dated Mar. 5, 2019, 6 pgs.
Excerpts from Presentation regarding Frac Shack FracFueller to RockPile Energy Services (Jan. 27, 2015), 3 pages.
Frac Shack Inc.'s Preliminary Response to Petition for Inter Partes Review of U.S. Pat. No. 9,346,662, dated Sep. 6, 2017, 76 pages.
Hatch Mott Machdonald, "aviation fueling Technology Update," URL=http://www.hatchmott.com, 2009, 9 pages.
Headquarters, Department of the Army, "Technical Manual Operator and Unit Maintenance Manual (Including Repair parts and special Tools list) for Forward Area Refueling Equipment (FARE) (American Air Filter Model RFE 1000 NSN 4930-00-1 33-3041," Sep. 26, 1991, 129 pages.
*Hose Handbook*, Seventh edition, The Rubber Manufacturers Association, Inc., Washington, D.C., 2003, 116 pages.
Jun. 9, 2010 Safety Report by S. Hanelt of Safety BOSS Inc. for Randy Arkinstall, of Nexen Inc. and Mar. 26, 2015 letter regarding incorrect date of original report, 5 pages.
K. DeMong et al., SPE 140654—Advancements in Efficiency in Horn River Shale Stimulation, Jan. 24-26, 2011, 15 pages.
K.S. Low et al., Wireless Sensor Networks for Industrial Environments, IEEE 2005, 6 pages.
Koziarz et al., on behalf of Fuel Automation Station, LLC, Petition for Inter Partes Review, dated May 1, 2017, for U.S. Pat. No. 9,346,662 B2, 74 pages.
Lipták (Ed.), Instrument Engineers' Handbook, *Process Measurement and Analysis, vol. 1*, Fourth Edition, CRC Press, Boca Raton, FL., 2003, p. 557, 3 pages.
MacCarley, Declaration with Appendix, dated May 1, 2017, for Petition for Inter Partes Review of U.S. Pat. No. 9,346,662 B2, 85 pages.
Mann Teknik Aviation Coupling Brochure, "DACouplings Dry Aviation Couplings 2½" Couplings According to standards ISO 45 / MS 24484 / STANAG 3105" version 041020, Dec. 2004, 8 pages.
Mann Teknik Coupling Brochure, "DDCouplings® Kill the spill," version 040927, Dec. 2007, 16pages.
McClellan (Ed.) et al. "Glossary, Float-type and capacitance-type fuel gages," *Flying* 122(5):40, 1995, 3 pages.
Mohammad Reza Akhondi et al., Applications of Wireless Sensor Networks in the Oil, Gas and Resources Industries, IEEE 2010, 8 pages.
M.M. Reynolds et al., SPE 130103—Development Update for an Emerging Shale Gas Giant Field—Horn River Basin, British Columbia, Canada, Feb. 23-25, 2010, 17 pages.
M.W. Melaina, Energy Policy 35 (2007) 4919-4934—Turn of the century refueling: A review of innovations in early gasoline refueling methods and analogies for hydrogen, Jul. 1, 2007, 17 pages.
NFPA 30A, Code for Motor Fuel Dispensing Facilities and Repair Garages (2008 Ed.), 3 pages.
North Atlantic Treaty Organization Advisory Group for Aerospace Research and Development, "Aircraft Fuels, Lubricants, and Fire Safety," *Papers presented at the 37th meeting of the AGARD Propulsion and Energetics Panel Held at the Koninklijk Instituut van Ingenieurs, The Hague, Netherlands*, Published Aug. 1971, 14 pages.
Occupational Safety and Health Admin., Labor, 29 CFR §1926.152, "Flammable and combustible liquids", Jul. 1, 95 Ed., 16 pages.
Oil Field Services, Sun Coast Resources, Inc., Houston, Texas, brochure, 2009 (as listed on WayBack Machine), 2 pages.
Oilmen's Truck Tanks Inc., Spartanburg, SC, catalog, 2006, 162 pages.
OSHA Oil and Gas Well Drilling and Servicing e Tool Glossary of Terms—L ("location") and W ("well site"), © Petex 2001, 3 pages.
OSHA, Standard Interpretations, "Fire protection during the fueling of mobile equipment", Standard No. 1926.152, Jun. 11, 1996, 2 pages.
Petition for Inter Partes Review of U.S. Pat. No. 10,029,906, dated Apr. 19, 2019, 92 pages.
Plaintiff's Response to Invalidity Contentions, *Frac Shack* v. *Atlas*, No. 16-cv-02275, dated Feb. 9, 2017, 20 pages.
PTAB Decision of Non-Institution of Inter Partes Review of U.S. Pat. No. 9,346,662 dated Dec. 5, 2017, 20 pages.
Schultz, "Your fuel system: All you need to know about it," *Popular Mechanics* 148(5): 120-121, 1977, 3 pages.
Statement of Defence and Counterclaim, Canadian Federal Court Docket No. T-2149-14; *Frack Shack Inc.* v. *AFD Petroleum Ltd.*; Nov. 26, 2014, 10 pages.
Stojkov, *The Valve Primer*, Industrial Press Inc., New York, N.Y. 1997, pp. 65-69, 7 pages.
SureCross™ DX80 Quick Start Guide, Banner Engineering Corp., 2 pages.
T. Yeung et al., CSUG/SPE 149399—Equipment Consideration for Continuous High-Horsepower Fracturing Operations, Nov. 15-17, 2011, 19 pages.
Tubing, Piping, and Hose, capture of http://www.tpub.com/basae/76.htm on Jan. 16, 2003, downloaded from: http://web.archive.org/web/20030116142041/http:/www.tpub.com/basae/76.htm on May 1, 2017, 2 pages.
Syfan, Jr., "Expert Report of Frank E. Syfan, Jr.," dated Apr. 23, 2018, U.S.D.C. Colorado, *Frac Shack Inc.* v. *Atlas Oil Company et al.*, Case No. 1:16-cv-02275-STV, 30 pages. (Hereafter "Syfan Report").
SST Super Tank, Analog Level Controller, Simplex, Inc., Springfield, Illinois, brochure, 1995, 4 pages.
Exhibit 1 to Syfan Report dated Apr. 23, 2018, "Curriculum Vitae for Frank E. Syfan, Jr.," Case No. 1:16-cv-02275-STV, 5 pages.
Exhibit 2 to Syfan Report dated Apr. 23, 2018, "List of Materials Considered by Frank E. Syfan, Jr.," Case No. 1:16-cv-02275-STV, 2 pages.
Exhibit 3 to Syfan Report dated Apr. 23, 2018, "Photographs of E&H Drilling Co. Rig 4," Case No. 1:16-cv-02275-STV, 24 pages.
Exhibit 4 to Syfan Report dated Apr. 23, 2018, "Declaration of Ronnie Robertson," Case No. 1:16-cv-02275-STV, 24 pages.
Exhibit 5 to Syfan Report dated Apr. 23, 2018, "Video Depicting a Drilling Operation of Rig 4," Case No. 1:16-cv-02275-STV, 83 pages. (Cover Sheet and Screenshots).
Exhibit 6 to Syfan Report dated Apr. 23, 2018, "Video Depicting a Fueling System of Rig 4," Case No. 1:16-cv-02275-STV, 50 pages. (Cover Sheet and Screenshots).
Waste Minimization in the Oil Field by the Railroad Commission of Texas, Oil and Gas Division, Railroad Commission of Texas, brochure, Jul. 2001, 243 pages.
Webber, "Expert Report of Michael E. Webber, Ph.D.," dated Apr. 23, 2018, U.S.D.C. Colorado, *Frac Shack Inc.* v. *Atlas Oil Company et al.*, Case No. 1:16-cv-02275-STV, 69 pages. (Hereafter "Webber Report").
Exhibit 1 to Webber Report dated Apr. 23, 2018, "Curriculum Vitae for Michael E. Webber," Case No. 1:16-cv-02275-STV, 80 pages.
Exhibit 2 to Webber Report dated Apr. 23, 2018, "List of Materials Considered by Michael E. Webber," Case No. 1:16-cv-02275-STV, 2 pages.
Exhibit 3 to Webber Report dated Apr. 23, 2018, "Invalidity Claim Chart as Anticipated by Simplex," Case No. 1:16-cv-02275-STV, 34 pages.
Exhibit 4 to Webber Report dated Apr. 23, 2018, "Invalidity Claim Chart as Obvious over Simplex," Case No. 1:16-cv-02275-STV, 8 pages.
Exhibit 5A to Webber Report dated Apr. 23, 2018, "Simplex Piping Diagram—Main Tank Supplying Multiple Day Tanks: Pump to Manifold," Sep. 2000, Case No. 1:16-cv-02275-STV, 2 pages.
Exhibit 5B to Webber Report dated Apr. 23, 2018, "Simplex Fuel Supply Systems Main Page," Jun. 2000, Case No. 1:16-cv-02275-STV, 4 pages.
Exhibit 5C to Webber Report dated Apr. 23, 2018, "Engineer's Specifications for Simplex Fuel Supply Systems," Sep. 2000, Case No. 1:16-cv-02275-STV, 8 pages.
Exhibit 5D to Webber Report dated Apr. 23, 2018, "Simplex Advanced Day Tanks (SST Series) Fuel Supply Network, Piping and Installation," Sep. 2000, Case No. 1:16-cv-02275-STV, 4 pages.

(56) References Cited

OTHER PUBLICATIONS

Exhibit 5E to Webber Report dated Apr. 23, 2018, "SST-25 Fuel Oil Day Tank Pictorial," Aug. 2010, Case No. 1:16-cv-02275-STV, 2 pages.
Exhibit 5F to Webber Report dated Apr. 23, 2018, "SST Super Tank: Analog Level Controller," 1995, Case No. 1:16-cv-02275-STV, 5 pages.
Exhibit 5G to Webber Report dated Apr. 23, 2018, "Day Tank Operation Manual," 2006, Case No. 1:16-cv-02275-STV, 16 pages.
Exhibit 5H to Webber Report dated Apr. 23, 2018, "SST Super Tank: Analog Level Controller," 2004, Case No. 1:16-cv-02275-STV, 5 pages.
Exhibit 5I to Webber Report dated Apr. 23, 2018, "Day Tank Quote Request," 2000, Case No. 1:16-cv-02275-STV, 4 pages.
Exhibit 6A to Webber Report dated Apr. 23, 2018, "Simplex Piping Diagram—Main Tank Supplying Multiple Day Tanks: Pump to Manifold," archived Sep. 30, 2000, Case No. 1:16-cv-02275-STV, 2 pages.
Exhibit 6B to Webber Report dated Apr. 23, 2018, "Simplex Fuel Supply Systems Main Page," archived Jun. 5, 2000, Case No. 1:16-cv-02275-STV, 4 pages.
Exhibit 6C to Webber Report dated Apr. 23, 2018, "Engineer's Specifications for Simplex Fuel Supply Systems," archived Sep. 30, 2000, Case No. 1:16-cv-02275-STV, 8 pages.
Exhibit 6D to Webber Report dated Apr. 23, 2018, "Simplex Advanced Day Tanks (SST Series) Fuel Supply Network, Piping and Installation," archived Sep. 30, 2000, Case No. 1:16-cv-02275-STV, 4 pages.
Exhibit 6I to Webber Report dated Apr. 23, 2018, "Day Tank Quote Request," archived Dec. 16, 2000, Case No. 1:16-cv-02275-STV, 4 pages.
Exhibit 7 to Webber Report dated Apr. 23, 2018, Air Force Handbook 10-222 vol. 5, "Guide to Contingency Electrical Power System Installation," Jul. 1, 2008, Case No. 1:16-cv-02275-STV, 144 pages.
Exhibit 8A to Webber Report dated Apr. 23, 2018, "Preferred Utilities Fuel Oil Handling System Design," Mar. 2006, Case No. 1:16-cv-02275-STV, 22 pages.
Exhibit 8B to Webber Report dated Apr. 23, 2018, "Preferred Utilities Automatic Fuel Oil Transfer Pump Set," Mar. 2006, Case No. 1:16-cv-02275-STV, 16 pages.
Exhibit 9 to Webber Report dated Apr. 23, 2018, "Diesel Engineering Handbook, $10^{th}$ Ed.," 1959, Case No. 1:16-cv-02275-STV, 12 pages.
Exhibit 11 to Webber Report dated Apr. 23, 2018, "Cummins Application Manual—Liquid Cooled Generator Sets: Fuel Supply," 2004, Case No. 1:16-cv-02275-STV, 19 pages.
Exhibit 12A to Webber Report dated Apr. 23, 2018, "Earthsafe Quadplex Integrated System Control Module," 2002, Case No. 1:16-cv-02275-STV, 4 pages.
Exhibit 12B to Webber Report dated Apr. 23, 2018, "Earthsafe Day Tank Models M500, M510, M520, and M530," 2002, Case No. 1:16-cv-02275-STV, 8 pages.
Exhibit 12C to Webber Report dated Apr. 23, 2018, "Earthsafe Correspondence re: Dating CentrPlex Model C900," Apr. 4, 2018, Case No. 1:16-cv-02275-STV, 4 pages.
Exhibit 13 to Webber Report dated Apr. 23, 2018, "Tramont Installation & Operation Manual: Day Tank—TRS Series," 2006, Case No. 1:16-cv-02275-STV, 61 pages.
Exhibit 14 to Webber Report dated Apr. 23, 2018, "New York City Fire Department Study Material for Certificate of Fitness P-98: Supervise Fuel-Oil Piping and Storage in Buildings," 2008, Case No. 1:16-cv-02275-STV, 22 pages.
Exhibit 15A to Webber Report dated Apr. 23, 2018, "Pryco, Inc. Technical Notes: Typical Fuel System Piping Diagram," Nov. 2006, Case No. 1:16-cv-02275-STV, 4 pages.
Exhibit 15B to Webber Report dated Apr. 23, 2018, "Pryco, Inc. Fuel Control & Monitoring System," Aug. 2006, Case No. 1:16-cv-02275-STV, 5 pages.
Exhibit 16 to Webber Report dated Apr. 23, 2018, "E&CA Automatic Day Tanks," Feb. 2001, Case No. 1:16-cv-02275-STV, 5 pages.
Exhibit 18 to Webber Report dated Apr. 23, 2018, "Markman Hearing Transcript," Jan. 24, 2018, Case No. 1:16-cv-02275-STV, 252 pages.
Exhibit 19 to Webber Report dated Apr. 23, 2018, "Role of Diesel Power Generators in the Oil & Gas Industry," 2006, Case No. 1:16-cv-02275-STV, 5 pages.
Exhibit 20 to Webber Report dated Apr. 23, 2018, "Fundamentals of Petroleum, 4th Ed.," 1997, Case No. 1:16-cv-02275-STV, 37 pages.
Webber, "Supplemental Expert Report of Michael E. Webber, Ph.D.," dated May 21, 2018, U.S.D.C. Colorado, *Frac Shack Inc.* v. *Atlas Oil Company et al.*, Case No. 1:16-cv-02275-STV, 3 pages.
Supplement to Exhibit 8, "Day Tanks," archived Mar. 14, 2006 and Nov. 13, 2006, Case No. 1:16-cv-02275-STV, 9 pages.
Exhibit 5 to Syfan Report dated Apr. 23, 2018, "Video Depicting a Drilling Operation of Rig 4," Case No. 1:16-cv-02275-STV, provided on CD-ROM.
Exhibit 5 to Syfan Report dated Apr. 23, 2018, "Video Depicting a Drilling Operation of Rig 4," Case No. 1:16-cv-02275-STV, 83 pages, provided on CD-ROM. (Cover Sheet and Screenshots).
Exhibit 6 to Syfan Report dated Apr. 23, 2018, "Video Depicting a Fueling System of Rig 4," Case No. 1:16-cv-02275-STV, provided on CD-ROM.
Exhibit 6 to Syfan Report dated Apr. 23, 2018, "Video Depicting a Fueling System of Rig 4," Case No. 1:16-cv-02275-STV, 50 pages, provided on CD-ROM. (Cover Sheet and Screenshots).
Examiner Requisition for Canadian Application No. 2789386, based on PCT/CA2011/050098, dated Dec. 11, 2018, 4 pgs.
Canada Federal Court of Appeal, 2018 FCA 140, A-63-17; A-97-17; A-103-17, Reasons for Judgment, dated Jul. 20, 2018, 36 pgs.
Full Examination Report for Australian Application No. 2017254826, dated May 8, 2018, 5 pgs.
Canada Federal Court, 2018 FC 1047, T-2149-14, Judgment and Reasons, dated Oct. 19, 2018, 22 pgs.
Canada Federal Court of Appeal, A-63-17; A-97-17; A-103-17, Amended Judgment, dated Aug. 2, 2018, 5 pgs.

* cited by examiner

FUEL DELIVERY SYSTEM AND METHOD

BACKGROUND

Technical Field

Fuel delivery systems and methods.

Description of the Related Art

Equipment at a well being fractured requires large amounts of fuel. Conventionally, if the equipment needs to be at the well site during a very large fracturing job, the fuel tanks of the equipment may need to be filled up several times, and this is done by the well-known method of manually discharging fluid from a fuel source into each fuel tank one after the other. If one of the fuel tanks runs out of fuel during the fracturing job, the fracturing job may need to be repeated, or possibly the well may be damaged. The larger the fracturing job, the more likely equipment is to run out of fuel. Dangers to the existing way of proceeding include: extreme operating temperatures and pressures, extreme noise levels, and fire hazard from fuel and fuel vapors.

BRIEF SUMMARY

A fuel delivery system and method is presented for reducing the likelihood that a fuel tank of equipment at a well site during fracturing of a well will run out of fuel. There is therefore provided a fuel delivery system for delivery of fuel to fuel tanks of equipment at a well site during fracturing of a well, the fuel delivery system comprising a fuel source having plural fuel outlets, a hose on each fuel outlet of the plural fuel outlets, each hose being connected to a fuel cap on a respective one of the fuel tanks for delivery of fuel to the fuel tank; and a valve arrangement at each fuel outlet controlling fluid flow through the hose at the respective fuel outlet. The valve arrangement may be a single valve, for example manually controlled. The fuel source may comprise one or more manifolds with associated pumps and fuel line or lines. Hoses from the manifolds may be secured to the fuel tanks by a cap with ports, which may include a port for fuel delivery, a port for a fluid level sensor and a port for release of air from the fuel tank during fuel delivery. The fluid level sensor combined with an automatically operated valve as part of the valve arrangement on the fuel outlets from the fuel source may be used for automatic control of fuel delivery. A manual override is preferably also provided to control fuel flow from the fuel outlets.

A method is also provided for fuel delivery to fuel tanks of equipment at a well site by pumping fuel from a fuel source through hoses in parallel to each of the fuel tanks; and controlling fluid flow through each hose independently of flow in other hoses.

A cap or fill head for a fuel tank is disclosed, comprising: a housing having a throat and a top end; a first port in the top end provided with a connection for securing a hose to the cap; and a second port in the top end holding a fuel level sensor.

These and other aspects of the device and method are set out in the claims, which are incorporated here by reference.

BRIEF DESCRIPTION OF THE SEVERAL VIEWS OF THE DRAWINGS

Embodiments will now be described with reference to the figures, in which like reference characters denote like elements, by way of example, and in which.

DETAILED DESCRIPTION

Immaterial modifications may be made to the embodiments described here without departing from what is covered by the claims. In the claims, the word "comprising" is used in its inclusive sense and does not exclude other elements being present. The indefinite article "a" before a claim feature does not exclude more than one of the feature being present. Each one of the individual features described here may be used in one or more embodiments and is not, by virtue only of being described here, to be construed as essential to all embodiments as defined by the claims.

Figure 1:
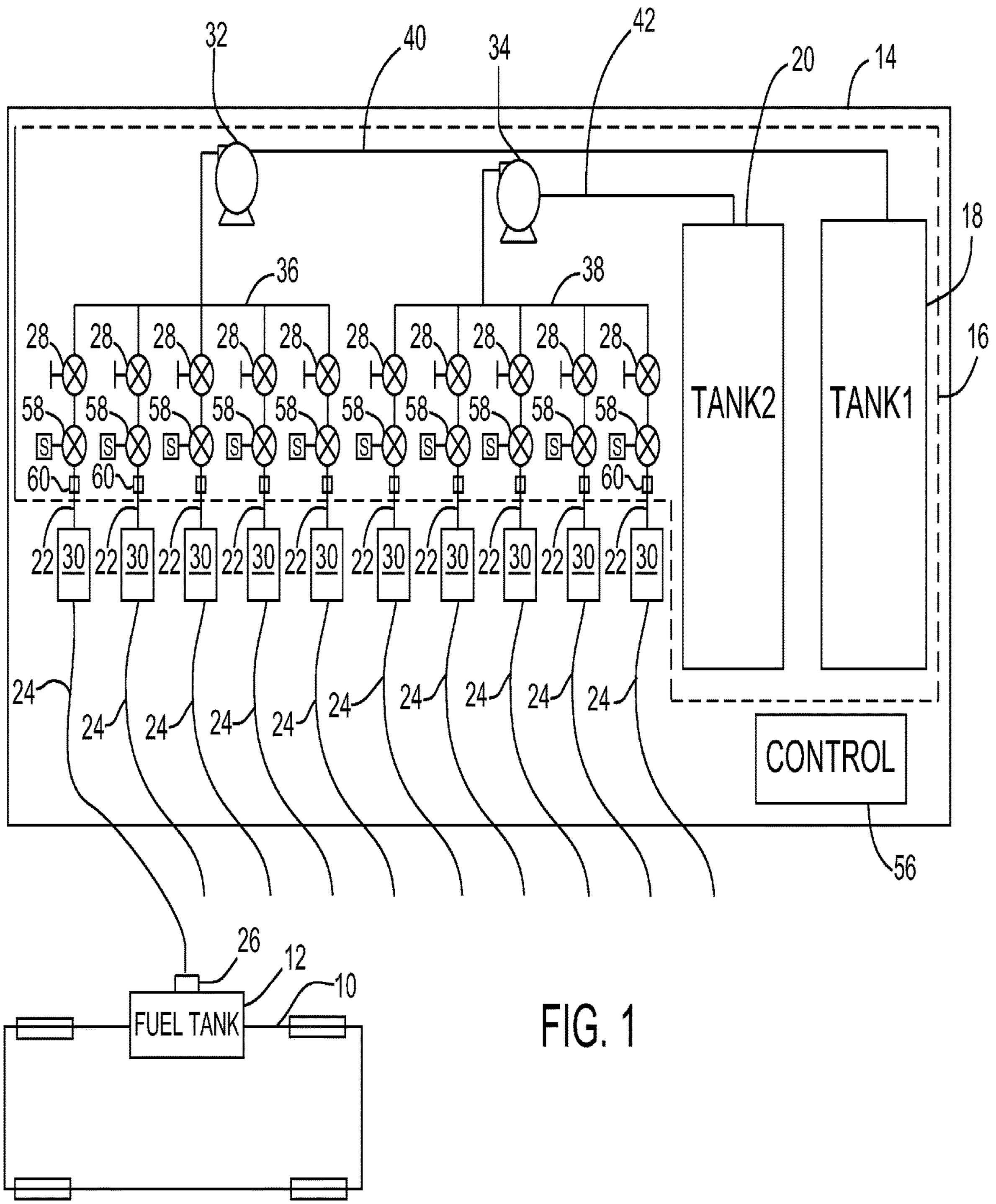
FIG. 1 is a schematic of a fuel delivery system.

Equipment at a well site use for a fracturing job may comprise several pumpers and blenders. A representative pumper 10 is shown in FIG. 1 with a fuel tank 12. Typically, the fuel tank 12 comprises a connected pair of tanks. A fuel delivery system 14 is provided for delivery of fuel to multiple fuel tanks 12 of multiple pieces of equipment 10 at a well site during fracturing of a well. The fuel delivery system 14 may be contained on a single trailer, for example wheeled or skidded, or parts may be carried on several trailers or skids. For use at different well sites, the fuel delivery system should be portable and transportable to various well sites.

The fuel delivery system 14 includes a fuel source 16. The fuel source 16 may be formed in part by one or more tanks 18, 20 that are used to store fuel. The tanks 18, 20 may be mounted on the same trailer as the rest of the fuel delivery system 14 or on other trailers. The tanks 18, 20 should be provided with anti-siphon protection. The fuel source 16 has plural fuel outlets 22. Respective hoses 24 are connected individually to each fuel outlet 22. Each hose 24 is connected to a fuel cap or fill head 26 on a respective one of the fuel tanks 12 for delivery of fuel to the fuel tank 12 through the hose 24. Hoses 24 may each have a sight glass (Visi-Flo™, not shown) to check flow and observe air-to-fuel transition. Sight glasses may be used on hoses 24 or elsewhere in the system. Pressure meters (not shown) may be provided for example on each of the hoses 24 from the manifold to determine head pressure as well as deadhead pressure from the pumps 32, 34. A valve arrangement, comprising for example valve 28 and/or valve 58, is provided at each fuel outlet 22 to control fluid flow through the hose 24 connected to each respective fuel outlet 22 to permit independent operation of each hose 24. The valve arrangement preferably comprises at least a manually controlled valve 28, such as a ball valve, and may comprise only a single valve on each outlet 22 in some embodiments. The hoses 24 are preferably stored on reels 30. The reels 30 may be manual reels, or may be spring loaded. In order to accommodate the weight of hoses 24 on reels 30, the skid or trailer frame may have to be braced (not shown) sufficiently in order to prevent the hose 24 from forcing the frame open. Hose covers, such as aluminum covers (not shown), may be provided for capping hoses 24 that are not connected to fuel tanks 12, as a precaution in the event of a leak from a hose 24 or to prevent leakage in the event fuel is mistakenly sent through a hose 24 not connected to a respective fuel tank 12.

In the embodiment shown in FIG. 1, each tank 18, 20 is connected to respective pumps 32, 34 and then to respective manifolds 36, 38 via lines 40, 42. The fuel outlets 22 are located on the manifolds 36, 38 and fluid flow through the fuel outlets 22 is controlled preferably at least by the manual valves 28. In a further embodiment, the fuel outlets 22 may each be supplied fuel through a corresponding pump, one pump for each outlet 22, and there may be one or more tanks, even one or more tanks for each outlet 22. However, using a manifold 36, 38 makes for a simpler system. The manually controlled valves 28 are preferably located on and formed as part of the manifolds 36, 38.

Figure 2:
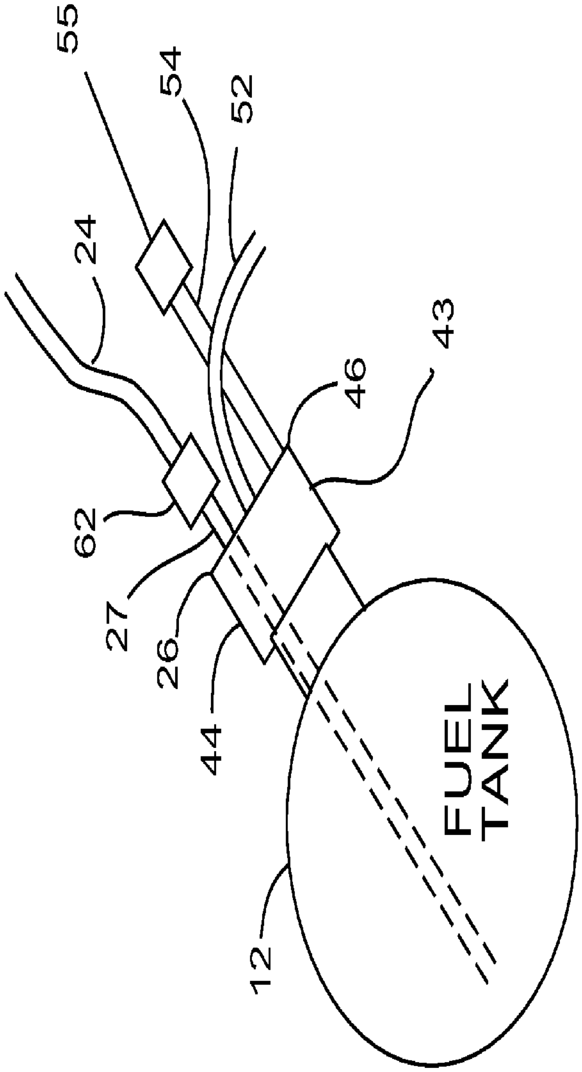
FIG. 2 is a side view of a tank to which fuel is to be delivered.
Figure 3:
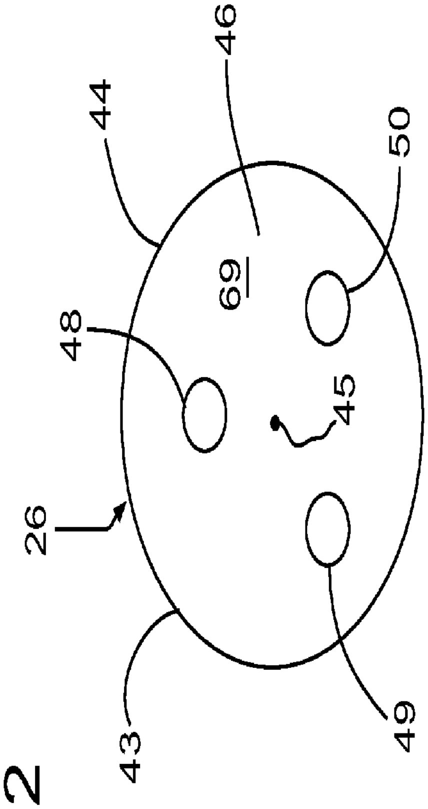
FIG. 3 is a top view of a cap for delivering fuel to the tank of FIG. 2.

The fuel caps 26 are shown in FIGS. 2 and 3 in more detail. Each fuel cap 26 is provided with a coupling for securing the fuel cap 26 on a tank 12, and this coupler usually comprises a threaded coupling. The fuel cap 26 comprises a housing 43 with a throat 44, threaded in the usual case for threading onto the fuel tank 12, and top end 46. Throat 44 may define a central housing axis 45 (FIG. 3). A quick coupler, not shown, may be included between the top end and throat. The throat may be sized for different sizes of fuel tank inlets. In one embodiment, the fuel cap 26 comprises at least three ports 48, 49 and 50 in the top end 46. One of the ports 48 may be provided as a breather port with a line 52 extending from the cap 26 preferably downward to allow release of air and vapor while the tank 12 is being filled with fuel. A pail (not shown) may be provided at the end of line 52 in order to catch any overfill. A one-way valve may be added to the breather port, for example to reduce the chance of fuel being spilled through the breather port during filling of fuel tanks 12 on equipment such as pumpers that vibrate violently. However, in another embodiment such fuel tanks 12 on violently vibrating equipment may simply be restricted from filling past a level relatively lower from non-vibrating equipment in order to reduce spilling. The cap 26 preferably seals the inlet on the fuel tank 12 except for the vapor relief line 52. Each cap 26 also preferably comprises a fuel level sensor 54 mounted in port 49. The fuel level sensor 54 may be any suitable sensor such as a float sensor, vibrating level switch or pressure transducer. A suitable float sensor is an Accutech FL10™ Wireless Float Level Field Unit.

The sensor 54 preferably communicates with a control station 56 on the trailer 14 via a wireless communication channel, though a wired channel may also be used. For this purpose, the fuel level sensor 54 preferably includes a wireless transceiver 55, such as an Accutech™ Multi-Input Field Unit or other suitable communication device. Transceiver 55 may be provided with a mounting bracket (not shown) or clip for attachment to fuel tank 12. This may be advantageous in the event that fuel tank 12 does not have sufficient headspace to allow transceiver 55 to be positioned as shown in FIG. 2. The control station 56 comprises a transceiver that is compatible with the transceiver at the sensor 54, such as an Accutech™ base radio, and a variety of control and display equipment according to the specific embodiment used. In an embodiment with automatically operating valves 58, the control station 56 may comprise a conventional computer, input device (keyboard) and display or displays. In a manual embodiment, the operator may be provided with a valve control console with individual toggles for remote operation of the valves 58, and the valve control console, or another console, may include visual representations or displays showing the fuel level in each of the tanks 12. Any visual representation or display may be used that shows at least a high level condition (tank full) and a low level condition (tank empty or nearly empty) and preferably also shows actual fuel level. The console or computer display may also show the fuel level in the tanks 18, 20 or the rate of fuel consumption in the tanks 18, 20.

The port 50 may be used to house a conduit 27 such as a drop tube, pipe, or flexible hose that extends down through the cap 26 to the bottom of the fuel tank 12, and which is connected via a connection 62, for example a dry connection, to one of the hoses 24. The conduit 27 should extend nearly to the bottom of the fuel tank 12 to allow for bottom to top filling, which tends to reduce splashing or mist generation. The conduit 27 may be provided in a length sufficient to eliminate generation of static electricity. A telescoping stinger could be used for the conduit 27. If the fuel tank 12 has an extra opening, for example as a vent, this vent may also be used for venting during filling instead of or in addition to the port 48, with the vent line 52 installed in this opening directing vapor to the ground. Where only the extra opening on the fuel tank 12 is used, the cap 26 need only have two ports. In another embodiment requiring only two ports, venting may be provided on the cap 26 by slots on the side of the cap 26, and with the other ports used for fuel delivery and level sensing. To provide the slots, the top end of a conventional cap with slots may have its top removed and replaced with the top end 46 of the cap 26, with or without the additional vent 48, depending on requirements. A pressure relief nozzle may be provided on hoses 24, or at any suitable part of the system in order to reduce the chance of pressure release upon disconnect or connection. A drain cock (not shown) may also be used to ensure that all pipes/hoses can be drained before removal. Each manifold may have a low-level drain.

The fuel delivery system 14 may be provided with automatic fuel delivery by providing the valve arrangement on the outlets 22 with an electrically operable valve 58 on each fuel outlet 22 shown in FIG. 1 with a symbol indicating that the valve 58 is operable via a solenoid S, but various configurations of automatic valve may be used. The control station or controller 56 in this embodiment is responsive to signals supplied from each fuel level sensor 54 through respective communication channels, wired or wireless, but preferably wireless, to provide control signals to the respective automatically operable valves 58. Each valve 58 includes a suitable receiver or transceiver for communicating with the control station 56. The controller 56 is responsive to a low fuel level signal from each fuel tank 12 to start fuel flow to the fuel tank 12 independently of flow to other fuel tanks 12 and to a high level signal from each fuel tank 12 to stop fuel flow to the fuel tank 12 independently of flow to other fuel tanks 12. That is, commencement of fuel delivery is initiated when fuel in a fuel tank is too low and stopped when the tank is full. A manual valve may also be provided for this purpose. Redundant systems may be required to show fuel level, as for example having more than one fuel sensor operating simultaneously. Having a manual override may be important to a customer. Manual override may be provided by using valves 28, and may also be provided on an electrically operated valve 58. The manual override should be provided on the low fuel side to allow manual commencement of fuel delivery and high fuel side to allow manual shut-off of fuel delivery.

Pump 32, 34 operation may be made automatic by automatically turning the pump(s) off after pressure in the system has risen to a predetermined level. For example, this may be done by adding a pressure switch (not shown) to the system, for example to the pump, which pressure switch would stop the power to the pump when all the valves, such as valves 28, 58, are closed and the pump has built up pressure to a predetermined level. As soon as one of the valves is opened the pressure from the pump line would drop off and the pressure switch would allow power back to the pump unit, allowing the pump to start and push fuel through the lines. Once all valves are shut again the pump would build pressure up to the predetermined pressure and the pressure switch would sense the rise in pressure and shut the power to the pump down again. In another embodiment, controller 56 may be set up to turn off the pump if all valves are closed. The pressure switch may be used as a redundant device in such an embodiment.

In the preferred embodiment, each hose 24 is connected to a fuel outlet 22 by a dry connection 60 and to a cap 26 by a dry connection 62. The hoses 24 may be 1 inch hoses and may have any suitable length depending on the well site set up. Having various lengths of hose 24 on board the trailer 14 may be advantageous. One or more spill containment pans (not shown) may be provided with the system, for example a pan of sufficient size to catch leaking fluids from the system during use. The pan or pans may be positioned to catch fluids leaking from each or both manifolds, and hose reels 30. Each manifold may have a pan, or a single pan may be used for both manifolds.

In operation of a fuel delivery system to deliver fuel to selected fuel tanks of equipment at a well site during fracturing of a well, the method comprises pumping fuel from a fuel source such as the fuel source 14 through hoses 24 in parallel to each of the fuel tanks 12 and controlling fluid flow through each hose 24 independently of flow in other hoses 24. Fluid flow in each hose 24 is controlled automatically or manually in response to receiving signals representative of fuel levels in the fuel tanks. Fuel spills at each fuel tank 12 are prevented by providing fuel flow to each fuel tank 12 through the fuel caps 26 on the fuel tanks 12. Emergency shut down may be provided through the manually operated valves 28. The caps 26 may be carried with the trailer 14 to a well site and the caps on the fuel tanks at the well site are removed and replaced with the caps 44. The trailer 14 and any additional fuel sources remain on the well site throughout the fracturing job in accordance with conventional procedures. The emergency shut down may be provided for example to shut all equipment including valves and pumps, and may activate the positive air shutoff on the generator.

The number of outlets 22 on a manifold 36, 38 may vary and depends largely on space restrictions. Five outlets 22 per manifold 36, 38 is convenient for a typical large fracturing job and not all the outlets 22 need be used. Using more than one manifold permits redundancy in case one manifold develops a leak. The hoses 24 are run out to equipment 10 through an opening in the trailer wall in whatever arrangement the well operator has requested that the fracturing equipment be placed around the well. For example, one manifold 36 may supply fluid to equipment 10 lined up on one side of a well, while another manifold 38 may supply fluid to equipment 10 lined up on the other side. The hoses 24 may be conventional fuel delivery hoses, while other connections within the trailer 14 may be hard lines. The trailer 14 may be of the type made by Sea-Can Containers of Edmonton, Canada. The fuel sources 18, 20 may be loaded on a trailer separate from the trailer 14 and may constitute one or more body job tanker trucks or other suitable tanker or trailer mounted fuel tank for the storage of fuel. The fuel sources 18, 20 may be stacked vertically on the trailer 14 or arranged side by side depending on space requirements. The fuel sources 18, 20, etc., should be provided with more than enough fuel for the intended fracturing job. For some fracturing jobs, two 4500 liter tanks might suffice, such as two Transtank Cube 4s (trademark) available from Transtank Equipment Solutions.

The control station 56 may be provided with a full readout or display for each fuel tank 12 being filled that shows the level of fuel in the fuel tank 12 including when the fuel tank 12 is near empty and near full. An alternative is to provide only fuel empty (low sensor dry) or fuel full (high sensor wet) signals. The fuel level sensor 54 may be provided with power from a generator or generators in series (not shown) on the trailer 14 (not preferred), via a battery installed with the sensor 54 or directly from a battery (not shown) on the equipment 12. If a battery is used, it may need to be small due to space constraints on the cap 44. Various types of fuel sensor may be used for the fuel sensor 54. A float sensor is considered preferable over a transducer due to reliability issues. As shown schematically in FIG. 2, the fuel inlet on the fuel tank 12 is oriented at an angle to the vertical, such as 25°. Fuel level sensor 54 may be a hydrostatic pressure mechanism that references ambient atmospheric pressure as the base, and thus can operate at any altitude. Hydrostatic pressure sensors may be more robust than transducer systems and may have a sensing portion inserted into the fuel tank on a cable (not shown) depending downward from the fuel cap 26. If the failsafe is set to "close", all systems may need to be functioning in order for this system to give a reading. The operator can then tell immediately whether the system is functioning or not and take proactive steps to resolve any issue. No fuel may flow unless all systems are operating properly. Fuel requirements of a fuel tank 12 may be logged at the control station 56 to keep track of the rate at which the individual pieces of equipment 10 consume fuel. A, a filler or resin may be used in the electronic fittings (not shown) in the sensor 54 head for preventing liquid entry into the electronic components such as the wireless transceiver 55.

The manual valves 28 should be readily accessible to an operator on the trailer 14. This can be arranged with the manifolds 36, 38 mounted on a wall of the trailer with the outlets 22 extending inward of the trailer wall. Pressure gauges (not shown) may be supplied on each of the outlets 22, one on the manifold side and one downstream of the valve 28. As fuel levels in the fuel tanks 12 drop, a pressure differential between the pressure gauges can be used to determine a low fuel condition in the fuel tanks 12 and the fuel tanks 12 may be individually filled by an operator. During re-fueling at a fracturing job, the manual valves 28 may remain open, and the operator may electrically signal the automatic valves 58 to open, using an appropriate console (not shown) linked to the valves 58. The level sensor 54 at the fuel tank 12 may be used to indicate a high level condition. An automatic system may be used to close the valves 58 automatically in the case of a high fluid level detection or the operator may close the valves 58 using the console (not shown). In the case of solenoid valves being used for the valves 58, either cutting or providing power to the valves 58 may be used to cause the closing of the valves 58, depending on operator preference. A screen or filter may be provided upstream of the solenoids, in order to prevent debris from entering and potentially damaging the solenoid.

Hoses from the outlets 22 may be stored on reels 30 mounted on two or more shelves within the trailer 14. Filters (not shown) may be provided on the lines between the fuel sources 18, 20 and the pumps 32, 34. An example of a suitable filter is a five-micron hydrosorb filter. Another example of a filter is a canister-style filter added immediately after the pump. A fuel meter (not shown) may also be placed on the lines between the fuel sources 18, 20 and the pumps 32, 34 so that the operator may determine the amount of fuel used on any particular job. The pumps 32, 34 and electrical equipment on the trailer 14 are supplied with power from a conventional generator or generators (not shown), which may conveniently be mounted on the trailer. Size of the pumps 32, 34 should be selected to ensure an adequate fill time for the fuel tanks 12, such as 10 minutes, with the generator or generators (not shown) to supply appropriate power for the pumps and other electrically operated equipment on the trailer 14. Pumps 32, 34 may be removable in order to be changed out if required. For example, the pumps 32, 34 may be connected by non-permanent wiring. Pumps 32, 34 may be centrifugal pumps, such as Gorman-Rupp™ or Blackmer™ pumps. Lights and suitable windows in the trailer 14 are provided so that the operator has full view of the equipment mounted on the trailer and the equipment 10 being refueled. The spatial orientation of the control station 56, reels 30, manifolds 36, 38, tanks 18, 20 and other equipment such as the generators is a matter of design choice for the manufacturer and will depend on space requirements.

Preferably, during re-fueling of the fracturing equipment, fracturing equipment should not be pressurized and the fuel sources should not be located close to the fracturing equipment. Additional mechanical shut-off mechanisms may also be included, such as a manual shut-off on the remote ends of the hoses, for example at the dry connection 62. Hydro-testing may be carried out on all elements of the system, including the manifolds and piping. Hydro-testing may be carried out at a suitable time, for example at time of manufacture or before each use. For example, the system may be pressured up and left overnight to check for leakage. In addition, quality control procedures may be carried out, for example including doing a diesel flush in the system to clear all debris. A compressor (not shown) or source of compressed fluid such as inert gas may be provided for clearing the lines and the system of fuel before transport. In another embodiment, the pumps 32, 34 may be used to clear the lines, for example by pumping pumps 32, 34 in reverse to pull flow back into the tanks 18, 20.

Figure 4:
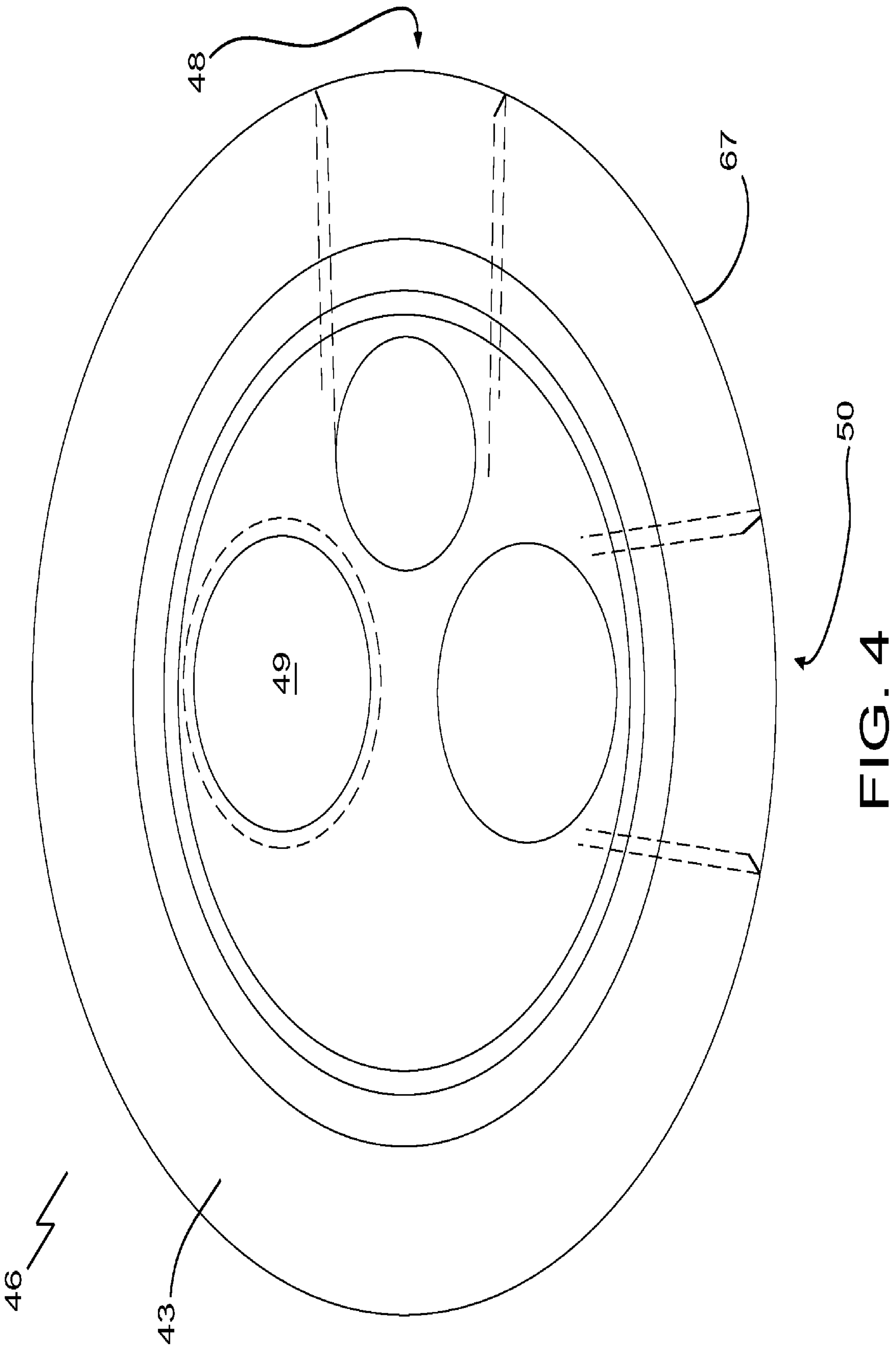
FIG. 4 is a bottom plan view of a top end of a cap for delivering fuel to the tank of FIG. 2.
Figure 5:
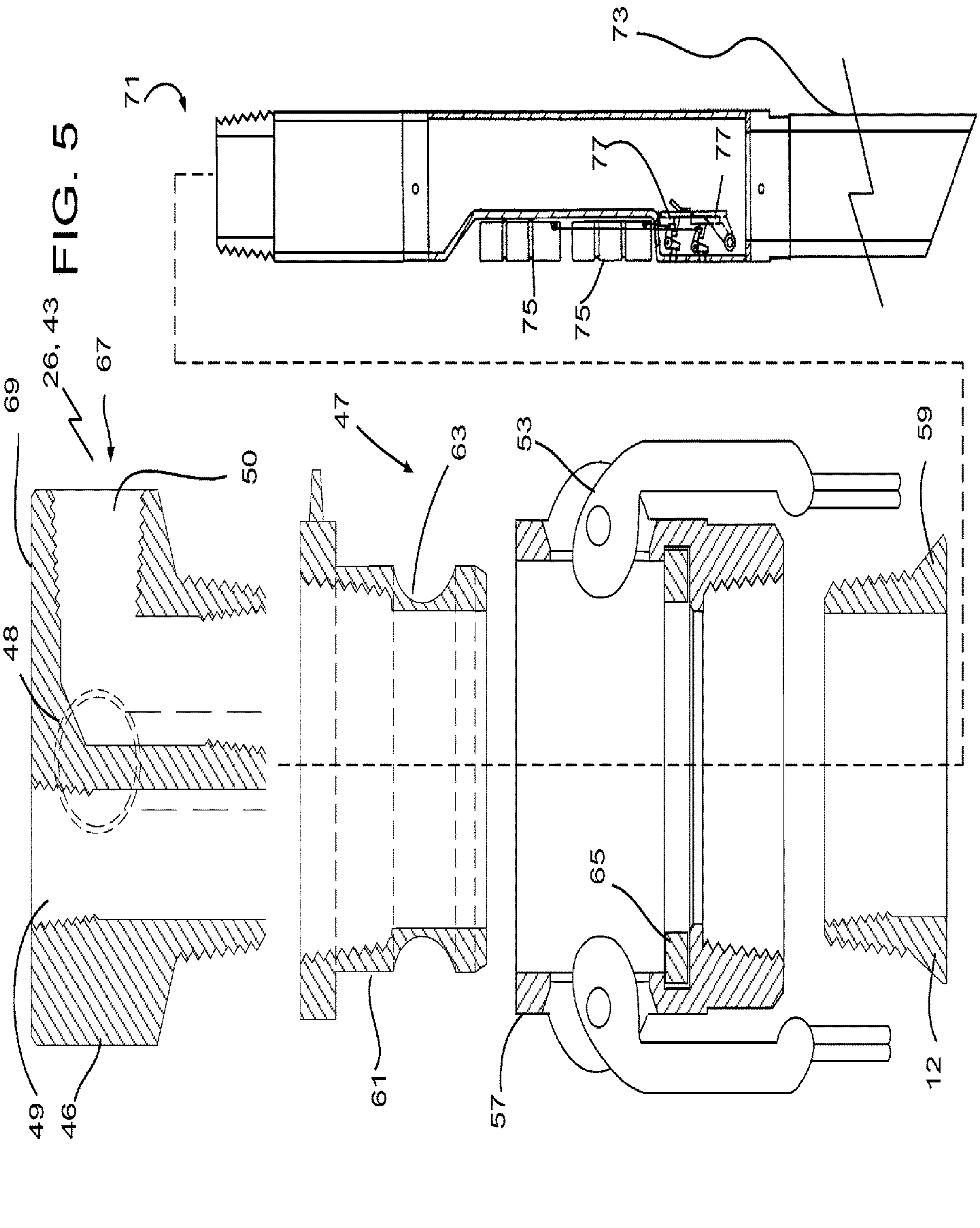
FIG. 5 is an exploded side elevation view, in section, of a fuel cap comprising the top end of FIG. 4 assembled with an intermediate portion, a bottom end, and an overfill protection valve. A fuel tank fill riser and overfill protection valve are also included in the image.

Referring to FIGS. 4-5, a top end 46 for another embodiment of a fuel cap 26 is illustrated. The fuel cap 26 assembly illustrated in FIG. 5 may be adapted to connect to the respective fuel tank 12 through a quick-connect coupling 47, which may comprise a camlock 53. In some cases the top end 46 may quick connect directly to the fuel tank 12. In other embodiments such as the one shown in FIG. 5, the housing 43 comprises a bottom end 57 adapted to connect to the fuel tank 12 for example by threading to a fill riser 59 of fuel tank 12. The bottom end may be provided in different sizes, for example to accommodate a 2" or 3" opening in the fuel tank or different designs of fill risers 59 such as a Freightliner™ lock top, and also a Peterbilt™ draw tight design. The top end 46 may be connected to the bottom end 57 directly or indirectly through quick connect coupling 47. Moreover, the housing 43 may further comprise an intermediate portion 61 between top end 46 and bottom portion 61. Intermediate portion 61 may be threaded to the top end 46 and connected to the bottom end 57 through the quick connect coupling 47. Although intermediate portion 61 is shown in FIG. 5 as being removably attached to top end 46, in some cases intermediate portion 61 may be permanently or semi-permanently attached to top end 46 for rotation. Such a rotatable connection between portion 61 and top end 46 may be adapted to channel pressurized fluids under seal, which may be achieved with one or more bearings and dynamic seals (not shown), for example much like the rotatable connection between a fuel hose and hand held fuel dispenser at a fuel service station. In other cases bottom end 57 and top end 46 may connect to fill riser 59 much like a garden hose, with bottom end 57 provided as a threaded collar that seals against a flange at a bottom end of top end 46 through an o-ring seal (not shown).

Quick connect coupling 47 may comprise an annular bowl 63 shaped to couple with camlock 53. Annular bowl 63 may be used with other quick connection couplings, and allows top end 46 to be installed at any desired radial angle. An o-ring 65 may be present in bottom end 57 for sealing against intermediate portion 61 upon locking of camlock 53. One or more of ports 48, 49, and 50 may be in a lateral surface 67, such as an annular surface as shown, of top end 46. As shown in FIG. 4, ports 48 (breather port) and 50 (fuel port) are in lateral surface 67. One or more of ports 48, 49, and 50 may be in a top surface 69 of top end 46 (FIG. 5). Fuel cap 26 may be adapted to connect to male or female connections on fuel tank 12.

Referring to FIG. 5, fuel cap 26 may comprise an overfill prevention valve 71. Valve 71 may provide independent protection or redundant overfill protection with fuel level sensor 54 (FIG. 2). Valve 71 may be directly or indirectly connected to port 50, for example as part of a drop tube 73 assembly. Valve 71 may comprise a float-operated overfill shut off system, for example using one or more floats 75 connected to release one or more flaps 77 to block input fuel flow through drop tube 73 after fuel in tank 12 has reached a predetermined level or levels. The valve 71 illustrated in FIG. 5 is similar to the twin flap system commonly used in underground storage tanks (USTs). Other overfill valve systems may use for example time domain reflectometry or contact sensors to ensure that fuel tank 12 is not overfilled.

A cabin (not shown) may be added to the system, for example comprising a heater, desk, and access to relevant control equipment. The cabin may have a window with a line-of-sight to the frac equipment. A dashboard may be visible from the cabin, the dashboard containing readouts of system characteristics such as fuel tank 12 levels. A gas detection system (not shown) may be used to detect the presence of leaking gas. In some embodiments, one or more of the hoses 24 may be provided with an auto nozzle fitting attachment to fill pieces of equipment other than fuel tank 12, in order to obviate the need for an on-site fuel source other than the fuel system disclosed herein. An electrical box (not shown) may be mounted on the skid or trailer with rubber or resilient mounts to reduce vibrational issues.

Some types of equipment such as frac pumpers have two tanks, which may be connected by equalization lines. In such cases, fuel cap 26 may be connected into the tank 12 opposite the tank 12 under engine draw, in order to reduce the turbulence caused by fuel filling which may cause air to be taken into the fuel intake, which may affect the performance of the pumper. The return flow from the engine generally goes into the opposite tank from which fuel is drawn.

The invention claimed is:

1. A method of reducing a likelihood of blenders and pumpers at a well site from running out of fuel during fracturing of a well, the blenders and pumpers including fuel tanks, the method comprising:

transporting a fuel delivery system including a fuel source to the well site on a trailer or trailers;

pumping fuel from the fuel source through hoses in parallel to each of the fuel tanks; and controlling fuel flow through each hose independently of fuel flow in other hoses.

2. The method of claim 1 further comprising preventing spills at each fuel tank by providing fuel flow to each fuel tank through a fuel cap on the fuel tank.

3. The method of claim 1 in which at least some of the hoses have a length that is different from others of the hoses.

4. The method of claim 1 in which controlling fuel flow in each hose comprises an operator controlling a respective valve between the fuel source and a corresponding fuel tank of the fuel tanks.

5. The method of claim 1 further comprising displaying fuel levels in the fuel tanks to an operator.

6. The method of claim 5 further comprising viewing the pumpers and blenders while fueling the pumpers and blenders.

7. The method of claim 1 in which controlling fuel flow in each hose comprises a controller system operating a respective valve between the fuel source and a corresponding fuel tank of the fuel tanks.

8. The method of claim 1 further comprising mounting the fuel source and hoses together with a controller and a manifold on a single trailer.

9. The method of claim 1 in which the fuel delivery system remains at the well site throughout a fracturing job.

10. The method of claim 1 further comprising storing the hoses on reels.

11. The method of claim 1 in which pumping fuel from the fuel source through hoses in parallel to each of the fuel tanks comprises supplying fuel through a manifold to the hoses.

12. The method of claim 1 further comprising starting fuel flow to a respective fuel tank upon receiving a low fuel level signal related to the respective fuel tank and stopping fuel flow to the respective fuel tank upon receiving a high level signal related to the respective fuel tank.

13. The method of claim 12 in which the high level signal corresponds to tank full.

14. The method of claim 12 in which the high level signal corresponds to a level less than tank full.

15. The method of claim 1 further comprising controlling fuel flow in each hose in response to receiving signals representative of fuel levels in the fuel tanks.

16. The method of claim 15 further comprising, after transporting the fuel delivery system including the fuel source to the well site on the trailer or trailers, removing a cap from each of the fuel tanks and replacing the cap with a respective fuel cap for providing fuel flow to each fuel tank.

17. The method of claim 16 further comprising, during filling of each fuel tank, releasing air and vapor from the fuel tank through a breather port on each fuel cap with a line extending downward from the fuel tank.

18. The method of claim 16 in which signals representative of fuel levels in the fuel tanks are provided by a fuel level sensor associated with each fuel cap.

19. The method of claim 16 in which each fuel cap is threaded onto a respective one of the fuel tanks.

20. The method of claim 16 in which each fuel cap is connected to a respective one of the fuel tanks by a quick connect coupling.

21. The method of claim 16 in which each hose is connected to a respective fuel cap by a dry connection.

22. A method for fuel delivery to selected fuel tanks of pieces of equipment at a well site during fracturing of a well, wherein the fuel tanks have caps on the fuel tanks, the method comprising:

transporting a fuel delivery system to a well site on one or more trailers, wherein the fuel delivery system includes hoses, each hose having a fuel delivery connection for connecting the hose to a respective fuel tank;

removing the caps from the selected fuel tanks;

attaching the hoses to the selected fuel tanks using the respective fuel delivery connection of each hose; and providing fuel to the selected fuel tanks through the fuel delivery connections.

23. The method of claim 22 in which commencement of the fuel delivery is initiated and stopped based on fuel levels in the selected fuel tanks.

24. The method of claim 22 further comprising controlling fuel flow through the hoses in response to signals representative of fuel levels in the selected fuel tanks provided by respective fuel level sensors associated with each fuel delivery connection.

25. The method of claim 22 in which providing fuel to the selected fuel tanks through the fuel delivery connection of each hose comprises pumping fuel from a fuel source through the hoses in parallel to each of the selected fuel tanks, controlling fuel flow through each hose independently of fuel flow in other hoses, and controlling fuel flow in each hose in response to receiving signals representative of fuel levels in the selected fuel tanks.

26. The method of claim 25 further comprising logging fuel consumption during fuel delivery.

27. The method of claim 25 further comprising pumping fuel from the fuel source through hoses in parallel to each of the fuel tanks.

28. The method of claim 27 in which pumping fuel from the fuel source through hoses in parallel to each of the selected fuel tanks comprises supplying fuel through a manifold to the hoses, the method further comprising mounting the manifold on a wall of a trailer.

* * * * *